United States Patent [19]

Wireman et al.

[11] 4,155,789

[45] May 22, 1979

[54] METHOD AND APPARATUS FOR PROGRAMMED SHAFT SYNCHRONIZATION

[75] Inventors: Jack Wireman, Yorba Linda; Richard E. Kazares, Huntington Beach, both of Calif.

[73] Assignee: AMF Incorporated, White Plains, N.Y.

[21] Appl. No.: 899,152

[22] Filed: Apr. 24, 1978

Related U.S. Application Data

[63] Continuation of Ser. No. 753,752, Dec. 23, 1976, abandoned, which is a continuation-in-part of Ser. No. 639,941, Dec. 11, 1975, abandoned.

[51] Int. Cl.$^2$ .................. B29H 17/02; B29H 17/36
[52] U.S. Cl. .................. 156/130; 156/361; 156/397; 226/42; 226/111; 242/75.51; 318/6
[58] Field of Search ............... 156/96, 110 R, 128 R, 156/130, 350, 361, 394, 397, 405; 226/42, 111; 242/75.5, 75.51; 318/6

[56] References Cited

U.S. PATENT DOCUMENTS

| | | | |
|---|---|---|---|
| 3,251,722 | 5/1966 | Holman | 156/130 |
| 3,308,000 | 3/1967 | Holman | 156/130 |
| 3,610,496 | 10/1971 | Parker | 226/42 |
| 3,716,442 | 2/1973 | Hineline | 156/361 |
| 3,843,482 | 10/1974 | Wireman et al. | 156/96 |
| 3,914,147 | 10/1975 | Wienand et al. | 156/361 |

FOREIGN PATENT DOCUMENTS 1273130  5/1972  United Kingdom.

*Primary Examiner*—John E. Kittle
*Attorney, Agent, or Firm*—George W. Price; Charles J. Worth

[57] ABSTRACT

The invention relates to an apparatus and method for producing an elastomeric extrudate having a constant cross section area. The extrudate is shaped in to a ribbon through a roller die and applied to a tire surface mounted on a rotating spindle. Digital electronic circuitry is employed to provide precise shaft synchronization at a pre-selected rotational velocity ratio between the rotating shafts. The synchronization assures repeatable velocity synchronization between the source of elastomeric material and a take-up device at the axis of rotation of the two components. The elastomeric material is extruded in a manner permitting control over the wrap operation and the amount of elastomeric material employed for a given cycle.

6 Claims, 2 Drawing Figures

U.S. Patent May 22, 1979 4,155,789
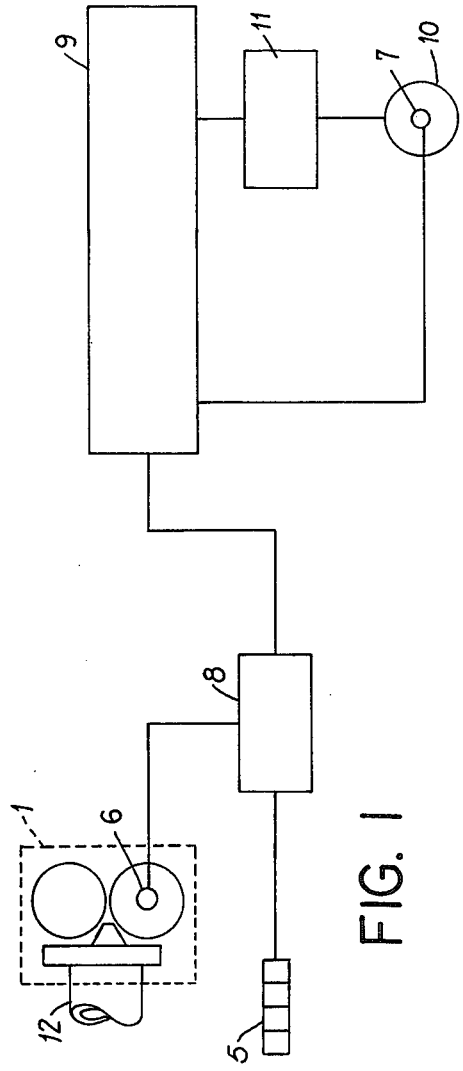
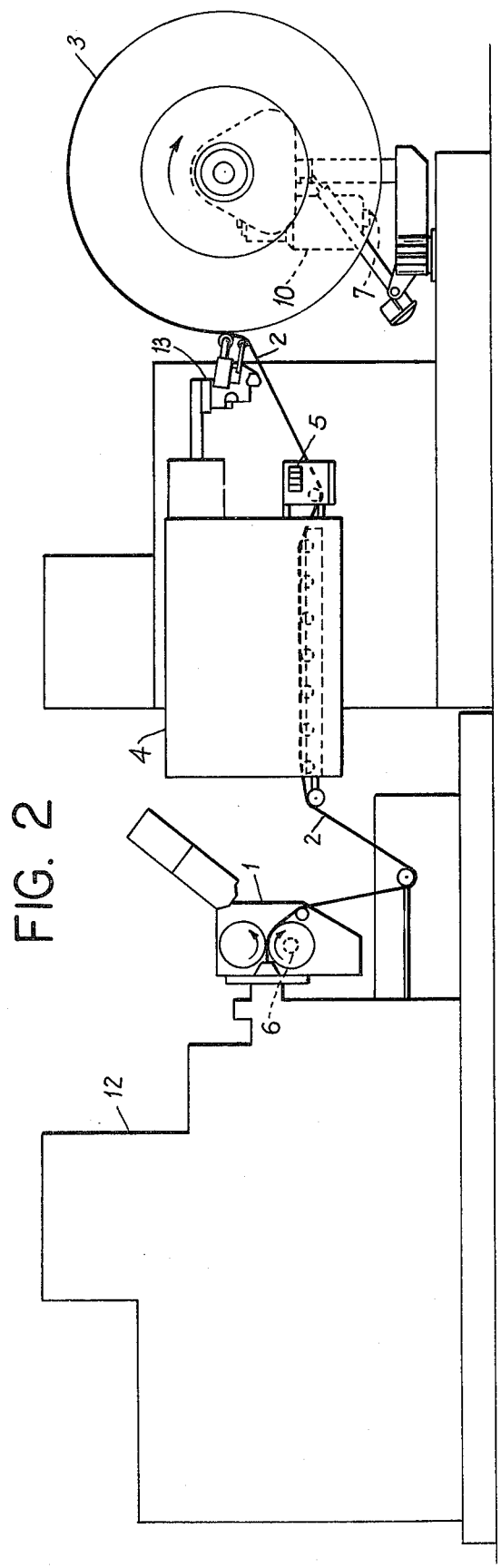
FIG. 2
FIG. 1

METHOD AND APPARATUS FOR PROGRAMMED SHAFT SYNCHRONIZATION

The present invention is a continuation of application Ser. No. 753,752, filed Dec. 23, 1976, which in turn is a continuation-in-part of Ser. No 639,941, filed Dec. 11, 1975, now both abandoned, and is directed to a method and apparatus employed in the manufacture of treads on tires.

More particularly, the present invention is directed to an arrangement by which it is possible to obtain accurate and repeatable synchronization of two or more rotating elements employed during the manufacturing operation.

During the manufacturing process it is necessary to rotate a tire carcass in order to cause a rubber ribbon to be wrapped about the carcass for the ultimate cutting of treads thereon. In order to control the manufacturing parameters, it is most desirable to synchronize the rotational velocity between the rate of formation of a rubber ribbon and an associated take-up surface i.e. tire carcass. By so doing, and in turn reducing velocity error and variability it is possible to produce advantages to the overall operation, including: consistency of rubber wrap, control over the amount of rubber employed per carcass and minimal waste of material, all of which were heretofore obtainable.

It is well accepted current practice to employ rubber ribbon loop tension control by well known analog components, referred to as a "dancer" control. The dancer control is principally based upon maintaining concerted action based on tension sensing means between the ribbon formation elements and a tire.

When employing such "dancers" there are a number of unfavorable characteristics and limitations which have been identified. These include: electrical circuit stability characteristics, rubber stock variation other than weight per unit length, slow response speed necessary for stability, electrical component value drift as a function of time and temperature. Furthermore, by its very geometry, the dancer introduces non-linear and uncontrollable variations in the weight per unit ribbon.

BACKGROUND

From the prior art familiar to applicants, it is known that the control variable is the surface velocity of the take-up mechanisms (tire or drum) employed during the wrapping operation. This is in contrast to the present invention, (as will be detailed hereinafter) where the take-up motor speed is directly controlled without sensing the surface velocity or tension of the loop. It follows that with the present invention, it is not necessary to have the rubber present for the control system to function. The most apparent advantage is employing this type of control is that all errors involved with the sensing of rubber, as well as errors in weight which have to do with variations in take-up (tire) diameter, are eliminated. By the present invention, material build-up of a constant weight independent of surface variations is attainable.

None of the dancers or loop control systems of prior art equipment operate in a similar fashion. This departure from the prior art is quite significant and represents a clear advantage in the field of technology. What makes the present invention important it that one would not normally assume that control without sensing tension is more accurate than with sensing the tension of the feed material; this, of course, assumes that the cross-section geometry of the raw material is constant.

In further contrast to the present invention, the prior art, such as shown and disclosed in U.S. Pat. No. 3,610,496, employs an arrangement for web tension control necessitating a dependent input velocity, for an example, a controllable input, and functions through a series of mechanical assemblies, whereby the input and output shafts are controlled through the drive belt ratio. This prior art patent employs electrical pulses for mechanical adjustment of a pulley to control the belt drive reducer position and hence speed ratio is attained. The limitations inherent to this prior art, only permits its use on solid or non-stretchable web materials (not rubber ribbon). In contrast to the aforementioned, the present invention functions through an independent input velocity in which the output shaft is only controlled as a function of the input shaft velocity and ratio selected. This being accomplished through electronic counting and voltage control through an amplifier/controller of a DC motor with the result that motor speed is controlled directly. A more detailed discussion follows hereinafter. Of interest is the fact that with the present invention, shaft velocity synchronization can be attained with both elastomeric and non-plastic web materials.

In conclusion, the very nature of the present invention as employed with the deposition of rubber ribbon does not afford the control of input velocity in any fashion as is disclosed in the prior art. Hence, with the present invention only output velocity is controlled to effect synchronization of shaft velocities. It follows that with the teachings of prior art such as U.S. Pat. No. 3,610,496 one could not apply such control systems for the present intended purpose.

The present invention can operate with an apparatus of the type shown and disclosed in U.S. Pat. Nos. 3,251,722 and 3,308,000. In particular, the required rotational velocities are synchronized by means of the present invention.

The main object of the present invention is to overcome the defects of the prior art.

Still another object of the present invention is to employ an apparatus which will enable the tire treading operation to take place at maximum obtainable extrusion rates.

Still a further object of the present invention is to provide an apparatus and method which will permit complete tire profile control on a repeatable basis for any given production run.

Still other advantages of the present invention will be best understood with respect to the specification, claims and accompanying drawings.

IN THE DRAWINGS

FIG. 1 is a schematic diagram of the invention.

FIG. 2 is an elevational view illustrating the equipment employed for use with the invention.

The principle features of the invention are directed to an apparatus for producing an elastomeric extrudite having a constant cross-sectional area, said extrudite being formed into a shaped ribbon by passage through a ribbon forming structure disposed downstream from an extrusion device, said extrudite being applied to a tire substrate surface disposed about a rotatable spindle for rotating a tire thereon, said apparatus being adapted to continuously feed extrudite into said ribbon forming structure having a rotational rate of travel in direct relationship to the rotational rate of travel of the tire substrate surface, and including: linkage means for electrically linking said forming structure to said rotatable spindle, said linkage means being defined by a first optical sensing means disposed on the axis of rotation of said ribbon forming structure; said first optical encoding means being disposed on said forming structure, for transmitting an electrical output signal in response to rotational increments of said forming structure, and in direct relation to the velocity of said advancing ribbon; ratio programmer means in electrical circuit relation to said first encoding means, for receiving an output signal from said encoding means in response to rotational increments of said shaping structure, said output signal of said ratio programmer being compared to an electrical signal transmitted by a second optical encoder disposed on said rotatable spindle; and means for ascertaining a difference between output values of said ratio programmer and said second encoder, to thusly provide a corresponding electrical input to motor control means for controlling the rotational velocity of said rotatable spindle.

Also within the scope of the invention is a method of elastomeric material deposition upon a tire substrate including the steps of: introducing a rubber tread material into an extruder; feeding the extrudite into a rubber ribbon shaping structure disposed in proximity to a tire substrate to be treated; placing the shaped rubber ribbon on said tire substrate disposed upon a rotating spindle; advancing said extrudite into said rotating shaping structure at a direct rotational velocity in synchronism with said rotating spindle; monitoring rotational increments of said rotating ribbon shaping structure in direct relation to the velocity of said tire spindle; comparing an output signal of said shaping structure to a signal generated in respect of said rotating spindle, and transmitting a differential output signals to a motor control means for adjusting the rotational velocity of said tire spindle.

As discussed in the present application, the roller die 1 is intended to relate to operational characteristics and structure shown and described in our U.S. Pat. No. 3,975,126.

According FIGS. 1 and 2, the invention as described herein is provided with a roller die 1 mounted on a standard extruder assembly 12 used to provide an accurate measurement of the length of constant area ribbon 2 produced for placement by applicator member 13 on to a tire 3 to be treaded. An electronic programmer assembly 4 is employed to control the lateral placement of the ribbon on the tire surface.

The tire spin rate is controlled by the invention whereby a programmable ratio shaft synchronization assembly electronically links the rotational rate of the roller die 1 to the rotational spin rate of tire 3. The invention eliminates all active control functions heretofore necessary to obtain process repeatability. The relative rotational velocity between the roller-die 1 and the tire 3 is selectable and programmed digitally by use of a selector switch 5. Furthermore, the invention has the capability of applying the formed ribbon 2 with tension, resulting in superior application and adherence of the ribbon 2 to the tire 3 as compared to low tension methods known to the prior art.

Quite significantly, it has been found that by holding the rotational velocity of the tire 3 as a direct function of the roller die 1 it is possible to obtain discrete weight changes in selected increments. This particular feature designated as the ratio selector 5 is extremely worthwhile and is of importance in order to compensate for rubber density variations occurring during the normal production of rubber materials.

PREFERRED MODE OF OPERATION

For a given diameter of tire 3 being worked upon there is employed a specified ratio between the tire 3 and roller die 1. This ratio falls within a prescribed range for a given tire diameter and accordingly it is necessary to specify a predefined ratio. The apparatus as shown in FIG. 2 employs digital electronic circuitry shown in block diagram form in FIG. 1. With such circuitry, the formation of the rubber by roller die 1 and application of the ribbon 2 on to the tire 3 occurs in a synchronism. That is, there takes place velocity synchronization of roller die 1 and tire 3 spin rates at a ratio selected by switch 5. The present system consists of two optical shaft encoders 6, 7 a ratio programmer 8 and a control-processor 9. The ratio programmer 8 comprises circuitry for performing the function of modifying the count of the input or "master" encoder, according to the ratio set in switch 5. The circuit elements consists of a voltage controlled oscillator, phase detector, a programmable driver, and such circuitry as is required to discriminate the value set in switch 5. The circuit operates in a well-known manner of a phsse-lock loop. The control processor 9 comprises circuitry having as primary elements, an anti-coincidence circuit, gating and initializing circuits, an up-down counter, a digital to analog converter, and a velocity damping loop. Such circuitry serves to generate a DC motor controller 11 input voltage by monitoring the difference in counts of the previously ratioed input encoder 6 signal and the follower encoder 7 signal. As a difference in counts accumulates in the up-down counter, the digital to analog converter produces an appropriate voltage signal to the DC motor controller 11. This causes the DC motor 10 to increase or decrease its velocity in such a manner as to drive the count difference (between ratioed input and output signals) to zero. The velocity damping loop is used to provide a damping function for the DC motor controller 11, to assure smooth motion.

In actual operation, an optical encoder 6 is attached to a roller shaft of roller die 1. This encoder 6 monitors rotational increments of the roller-die 1 and is directly proportional to the ribbon velocity. The output signal of encoder 6 is transmitted to the ratio programmer 8 and is modified by a ratio value determined by switch 5. The output of the ratio programmer 8 is compared to the tire spin optical encoder 7 mounted on a tire spin motor shaft 10. The difference between the output values of the ratio programmer 8 and the tire spin optical encoder 7 is used to provide control input to a D.C. motor controller 11.

Digital electronic synchronization according to the invention assures repeatable velocity synchronization between the source of elastomeric material, i.e., roller die 1 and the take-up device, tire 3. The synchronization is acomplished at the axis of rotation of these two components. As mentioned previously, by synchronizing the rotational velocity directly, and not the surface velocities, the complete effect of tire-to-tire diameter (or circumferential length) variation on the tread weight is eliminated. In addition, the circumferential distributional accuracy of the thread is not altered by carcass non-uniformity.

An important consideration for the applicability of the subject invention within an elastomeric application process is the ability to extrude elastomeric material with a constant cross sectional area.

It will be understood that various changes and modifications may be made in the above described method and apparatus which provide the characteristics of the invention without departing from the spirit of the invention.

What we claim:

1. An apparatus for producing an elastomeric extrudate having a constant cross-sectional area, said extrudate being formed into a shaped ribbon by passage through a ribbon forming structure disposed downstream from an extrusion device, said extrudate being applied to a tire substrate surface disposed about a rotatable spindle for rotating a tire thereon, said apparatus being adapted to continuously feed extrudate into said ribbon forming structure having a rotational rate of travel in direct relationship to the rotational rate of travel of the tire substrate surface, and including: linkage means for electrically linking said forming structure to said rotatable spindle, said linkage means being defined by a first optical encoding means diposed on the axis of rotation of said ribbon forming structure; said first optical encoding means being disposed on said forming structure, for transmitting an electrical output signal in response to rotational increments of said forming structure, and in direct relation to the velocity of said advancing ribbon; ratio programmer means in electrical circuit relation to said first encoding means, for receiving said output signal from said first encoding means in response to rotational increments of said shaping structure and for producing an output signal equal to a predetermined ratio of said first optical encoding means output signal; a second optical encoder disposed on said rotatable spindle; means for accumulating the difference between the output of said second optical encoder and the output of said ratio programmer to produce an accumulated output signal; and means responsive to said accumulated output signal for providing an electrical signal for controlling the rotational velocity of said rotatable spindle.

2. A method of elastomeric material deposition upon a tire substrate including the steps of: introducing a rubber tread material into an extruder; feeding the extrudate into a rotating rubber ribbon shaping structure disposed in proximity to a tire substrate to be treated; placing the shaped rubber ribbon on said tire substrate disposed upon a rotating spindle; monitoring rotational increments of said rotating rubber ribbon shaping structure to produce a first electrical signal indicative of said rotational increments; monitoring rotational increments of said tire spindle to produce a second electrical signal indicative of said rotational increments; comparing said first and second output signals and accumulating the difference therebetween as a control signal; and transmitting said control signal to a motor control means for adjusting the relative rotational velocity of said tire spindle and said rotating rubber ribbon shaping structure.

3. A method of elastomeric deposition as claimed in claim 2, wherein said step of monitoring rotational increments of said rotating rubber ribbon shaping structure comprises the steps of: generating a third output electrical signal by first optical encoding signal means monitoring rotational increments of said ribbon produced in response to the position sensed at the axis of rotation of said ribbon shaping structure; and transmitting said third output signal to a ratio programmer means for modification into said first electrical signal which has a predefined ratio relationship with said third output signal.

4. A method of elastomeric deposition as claimed in claim 3, wherein said step of monitoring rotational increments of said rotating rubber ribbon shaping structure further comprises the steps of: positioning an electrical switch means for establishing said predetermined ratio relationship of said ratio programmer.

5. Apparatus for applying tread material to a tire carcass, comprising:
   roller die means for producing a ribbon of tread material;
   means for rotating said roller die means;
   means for guiding said ribbon onto said carcass while said carcass is rotated; and
   means, responsive to rotational increments of said roller die means, for rotating said carcass by rotational increments which are in a predetermined ratio with said rotational increments of said roller die means to synchronize the rotation of said carcass with the rotation of said roller die means without regard to the physical characteristics of said ribbon.

6. A method for applying tread material to a tire carcass, comprising the step of:
   rotating a roller die to form a ribbon of tread material;
   rotating said carcass in rotational increments which are in a predetermined ratio with the rotational increments of said roller die to synchronize the rotation of said carcass with the rotation of said roller die without regard to the physical characteristics of said ribbon; and
   guiding said ribbon onto said carcass while said carcass is rotated.

* * * * *